J. B. ATWOOD.
RAILWAY TRACK BRAKE.
APPLICATION FILED DEC. 2, 1907.
952,493.
Patented Mar. 22, 1910.
2 SHEETS—SHEET 1.
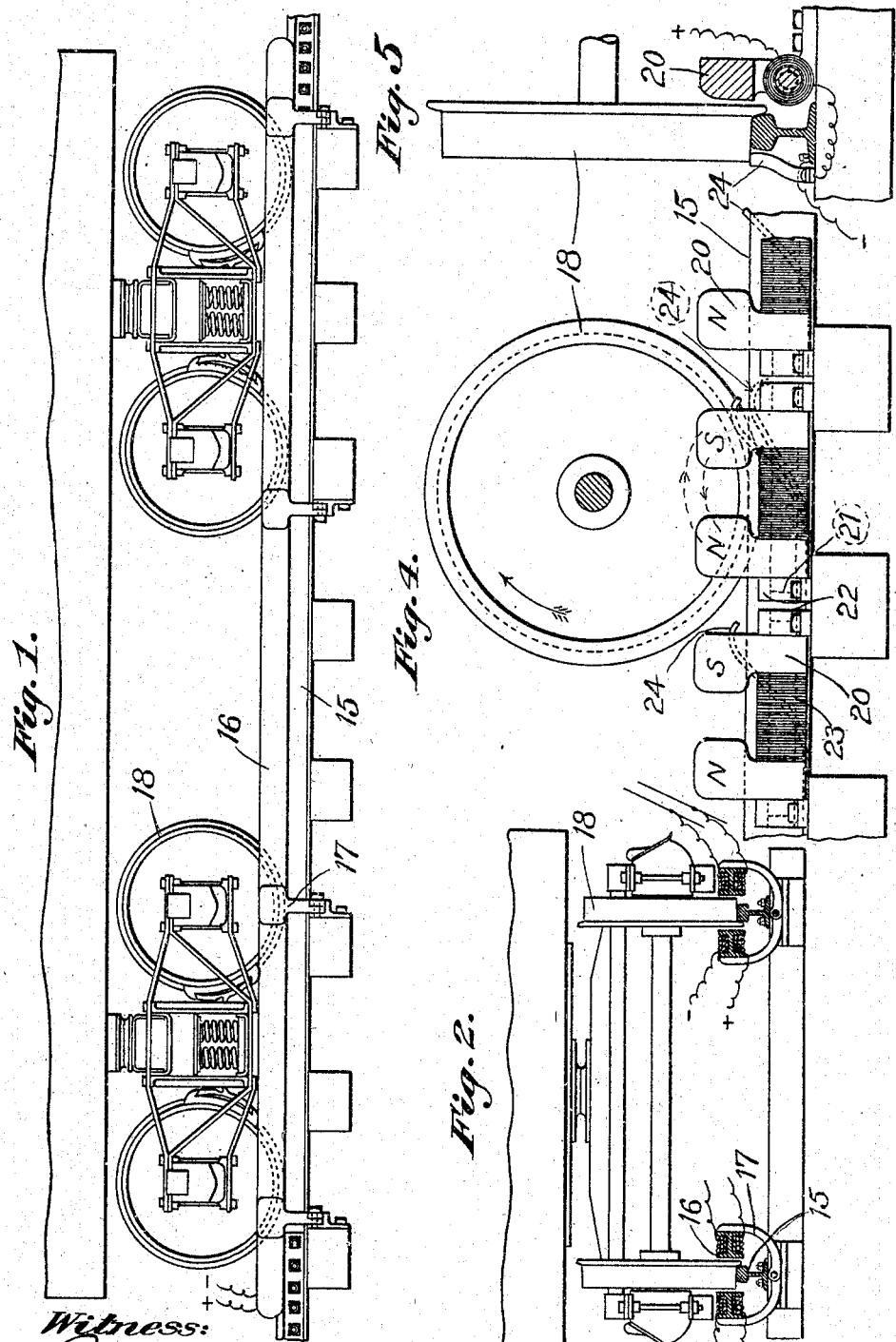
Witness:
C. M. Clarke
Fred Stout
Inventor,
John Baird Atwood
By F. W. H. Clay atty.

J. B. ATWOOD.
RAILWAY TRACK BRAKE.
APPLICATION FILED DEC. 2, 1907.
952,493.
Patented Mar. 22, 1910.
2 SHEETS—SHEET 2.
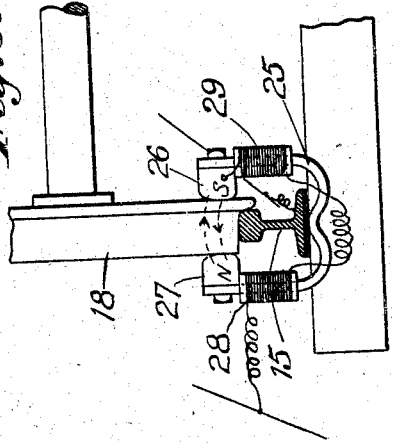
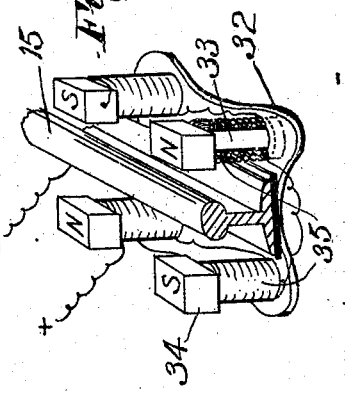
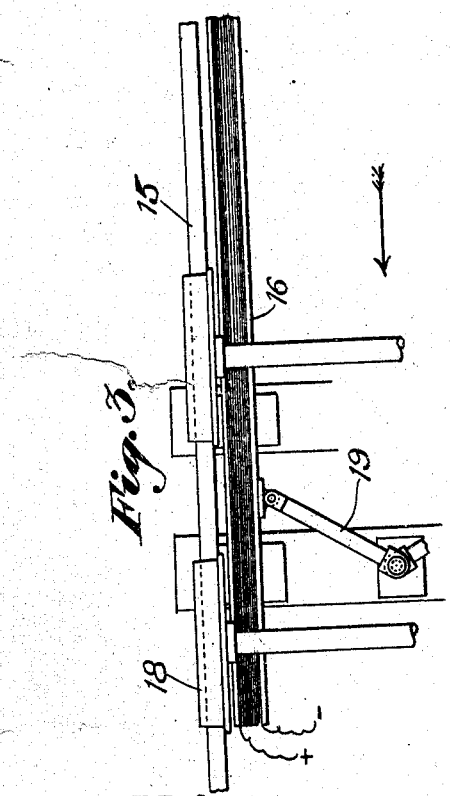
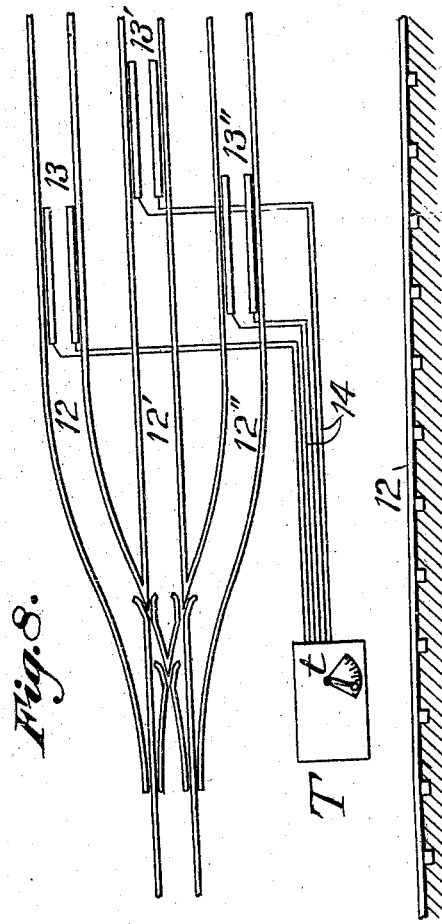
Witness:
O. M. Ricardo
Fred Staul
Inventor:
John Baird Atwood
By J. W. H. Clay
atty.

UNITED STATES PATENT OFFICE.

JOHN BAIRD ATWOOD, OF ALLEGHENY, PENNSYLVANIA.

RAILWAY-TRACK BRAKE.

952,493.

Specification of Letters Patent. Patented Mar. 22, 1910.

Application filed December 2, 1907. Serial No. 404,838.

*To all whom it may concern:*

Be it known that I, JOHN BAIRD ATWOOD, a citizen of the United States, residing at Allegheny, in the State of Pennsylvania, have invented a certain new and useful Railway-Track Brake, of which the following is a specification.

My invention relates especially to means for controlling the movements of cars on tracks by stationary brakes, and to brakes for such purpose operated by electric means. Its primary objects are to provide efficient means for stopping or holding cars on the grades of switch yards, etc., to provide an automatic brake and a brake of regulable power; to design efficient electro-magnets for such uses, and otherwise to improve and perfect stationary car handling brakes, as hereinafter more fully set forth.

I have illustrated the invention in several forms in the accompanying drawings, wherein—

Figure 1 is a side elevation showing a single pair of magnetic brakes engaging all the wheels of a car at once. Fig. 2 is a cross section of the brake bars, and front elevation of a car truck and wheels. Fig. 3 is a partial plan of a single bar brake, mounted to slide. Figs. 4 and 5 show respectively in side elevation and cross section a modified form of brakes in pairs, to be operated by the car wheel itself. Fig. 6 shows a further modification using a double point magnet, and Fig. 7 shows the use of a four-pole magnet with the wheel forming an armature. Figs. 8 and 9 are respectively a plan and a side elevation of some switch yard tracks arranged for convenient use of my invention. Fig. 10 is a further modification.

The great danger to both life and property, in hand-operated brakes for switching cars are well recognized; but so far all proposed stationary track brakes operated from a distance have not been efficient for handling heavy trains in switch yards. Such devices cannot be used unless thoroughly reliable; and very great power, easily controllable, is essential to success.

My present invention is intended especially for use in the so-called "gravity" switch yards, where trains are shifted by sending the separate cars or groups of cars down inclined switches. The arrangement is indicated in Figs. 8 and 9, where several branch tracks 12, 12′, 12″, are given a decided slope as shown in Fig. 9, and on each switch, at as many places as desired are placed stationary brakes 13, 13′, 13″, all operated preferably by electric wires 14 from a central observation tower T; and regulated by electric switches *t*.

In Figs. 1, 2 and 3 the tracks 15 are constructed as usual, and alongside them, on one or both sides, I place long magnet bars 16, preferably made of soft iron H beams and either supported to slide on the cross ties as in Fig. 3, or better, mounted on pivoted arms 17 as shown in Fig. 2. These bars have a limited motion to and from the rail 15 and are placed so as to engage the edge of the iron car wheels 18 a little above the rail top or the "dead point" of the wheel. They are wound with wire in any convenient manner as in the lengthwise fashion shown, and are energized by means located preferably in the central tower T, where the current strength is regulated and applied by a switch board *t*. When the operator wants a car stopped at the point where one or more of these brakes is located he throws on the current to energize the magnet 16, which by its attraction clings strongly to the car wheels and stops their rotation not only by friction but also by the "magnetic drag" and by the cutting of the lines of force by the moving wheel acting as an armature. Where the single track brakes are used only on the inside of the track as at Fig. 3, the bars 16 are preferably connected by toggle links 19 pivoted on the cross tie and slanting back against the direction of the car's motion, so that the friction and tendency to creep forward thrusts the bars the more tightly against the wheels.

A more efficient form of the brake is shown in Figs. 4 and 5, where electro-magnets 20 are mounted on trunnions 21 carried in brackets 22 alongside the rail 15 so as to engage the wheel 17 by both poles N and S at once. The iron is formed in a horse-shoe shape and the coil 23 is wound as shown and connected at one end directly to the line from the source of current and at the other end to a spring 24 which is normally insulated. This spring is arranged so that as soon as both poles N and S stand opposite the wheel the latter engages it and thus makes electric connection with the rail through which the circuit to the source is completed. The coil thus becomes energized when the wheel engages both poles of the magnet and remains energized until the wheel leaves both the poles,—the spring depressing as shown. The magnets are preferably placed in close succession so that each wheel will be continually passing through a field and acting as an armature moving across the poles. It will be understood that while the mechanical friction due to the pressure of poles N, S, on the wheel flange will have a powerful retarding effect, a still stronger retardation is effected by the moving of the wheel across the poles acting as an armature. This is due in part to the resistance to cutting the lines of force which run through the wheel and in part to the "magnetic drag" which seems to result probably from small iron particles having their polarity altered as they are disturbed by the friction. I do not of course limit myself to any theory of action; but the effect of the device described is to retard both the rotational and the linear motion of the wheels with great power and the car can be either stopped or retarded at any point desired, by proper manipulation of the current. It is to be noted that no current is being used at any time except in the coils employed to act on the wheels. When the car is stopped the magnets still hold it in place, and it is released by shutting off the current, as will be obvious.

In Fig. 6 is shown a form of magnet in which the wheel directly closes both the current and the magnetic circuits and forms a direct armature to the magnets. Thus, along the track 15 I place any desired number of show magnets 25 which have wearing shoes 26, 27 forming the brakes and poles. On the arms are wound coils 28, 29 in series so that 26 becomes a north and 27 a south pole, for example. The circuit is completed by the rail 15 when both the rail and pole 26 are in contact with the wheel. The magnet loop may be thin enough under the rail to bend if desired and it is insulated from the rail. The blocks 26, 27 normally stand in position to lightly engage the wheel, but the latter may easily crowd in between them as they have sloping faces.

Evidently, in operation each wheel makes the contact to energize each electromagnet as it comes to it and while in contact forms the armature between the poles. The shifting of position of the lines of force in it, the mechanical friction, the magnetic drag, and the direct attraction as it attempts to shift position or directly draw upward out of the magnet poles,—all contribute to produce a very powerful retarding effect, which can be regulated at the central station as desired.

It is not essential to my invention, in its broader aspects, that the moving wheel should be the armature, for it may sometimes be advisable to make the wheels themselves the poles of an electro-magnet and use a stationary armature bar, as illustrated in Fig. 10. The coil therein 30 is carried on the car axle and energized by means carried in the car; the iron bars 31 are the armatures, of which any number may be placed along the track.

A further modification of my invention is shown in Fig. 7, where the iron plate 32 and the four posts 33 carrying pole blocks 34, form a compound magnet with two pairs of poles as indicated. The wheel coming into contact with the second pair completes the circuit and the four coils 35 are energized. The wheel then forms at once four armatures as will be evident and any motion is resisted both by the lines of force being cut and by the direct attraction.

Having thus described my invention and illustrated its use, what I claim as new and desire to secure by Letters Patent, is the following:

1. A track brake for cars comprising an electro-magnet and an armature, the two co-operating to prevent turning the wheels, and the car wheels forming one of the said co-operating parts, substantially as described.

2. An electric track brake for cars in which the car wheel forms the armature of an electro-magnet.

3. A track brake comprising an electro-magnet mounted in the track and adapted to engage a moving car wheel.

4. An electro-magnetic track brake operated by the wheels of the car to be retarded.

5. The combination with a car wheel and a rail of an electro-magnet mounted to engage the wheel and having a circuit for its coils completed by the engagement of the wheel with the track and magnet.

6. The combination of an inclined track, a series of electro-magnets placed to engage car wheels on the track when energized and means including the car wheels to close the energizing circuit.

7. A track brake comprising a four-pole magnet placed to have all the magnetic circuits completed by a wheel on the track.

8. A railway track brake comprising an electro-magnet anchored under the rail and adapted to engage a wheel thereon so that the latter forms an armature.

In testimony whereof, I have hereunder signed my name in the presence of the two subscribed witnesses.

JOHN BAIRD ATWOOD.

Witnesses:
 F. W. H. CLAY,
 FRED STAUB.